(12) United States Patent
Madan et al.

(10) Patent No.: US 11,836,054 B2
(45) Date of Patent: Dec. 5, 2023

(54) FILE RESTORE PERFORMANCE IN A DEDUPLICATION FILE SYSTEM USING ADAPTIVE PREFETCHING

(71) Applicant: Dell Products L.P., Round Rock, TX (US)

(72) Inventors: Nitin Madan, Cupertino, CA (US); Donna Barry Lewis, Holly Springs, NC (US); Kedar Godbole, Pune (IN)

(73) Assignee: Dell Products L.P., Round Rock, TX (US)

( * ) Notice: Subject to any disclaimer, the term of this patent is extended or adjusted under 35 U.S.C. 154(b) by 72 days.

(21) Appl. No.: 17/558,300

(22) Filed: Dec. 21, 2021

(65) Prior Publication Data

US 2023/0195580 A1    Jun. 22, 2023

(51) Int. Cl.
*G06F 12/00* (2006.01)
*G06F 11/14* (2006.01)
*G06F 16/172* (2019.01)

(52) U.S. Cl.
CPC ...... *G06F 11/1469* (2013.01); *G06F 11/1453* (2013.01); *G06F 16/172* (2019.01)

(58) Field of Classification Search
CPC .............. G06F 11/1469; G06F 11/1453; G06F 16/172; G06F 3/0641; G06F 3/0647; G06F 3/065; G06F 12/0862; G06F 2212/602; G06F 2212/6022; G06F 2212/0782

See application file for complete search history.

(56) References Cited

U.S. PATENT DOCUMENTS

2003/0004882 A1*  1/2003  Holler ................... G06F 16/172
                                                              705/51

* cited by examiner

*Primary Examiner* — Shawn X Gu
(74) *Attorney, Agent, or Firm* — Staniford Tomita LLP

(57) ABSTRACT

Embodiments of small file restore process in deduplication file system wherein restoration requires issuing a read request within an I/O request to the file system. A prefetch queue processor creates an intent to read the file, rather than opening the file upon receiving the request. During this step, the application passes the file handle of the file, and the destination handle where the data must be read into. As the queue is processed, the prefetch for the request (handle/offset/length) is passed to the file server. The filesystem processes the request to equivalently 'open' the file, and bring the data into memory. As the read request for the same file reaches the filesystem the file data is read from memory for writing to the destination handle.

20 Claims, 9 Drawing Sheets

FILE RESTORE PERFORMANCE IN A DEDUPLICATION FILE SYSTEM USING ADAPTIVE PREFETCHING

TECHNICAL FIELD

Embodiments relate generally to deduplication storage systems, and more particularly to improving restoration of files using an adaptive prefetching mechanism.

BACKGROUND OF THE INVENTION

Data is typically backed up by copying the data from a data source to a data target or storage device or network. Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication.

Data restoration involves moving stored data from the storage target back to the data source or active tier after a data loss event on the data source. In a typical filesystem, the restore operations are aided by a read-ahead (prefetch) mechanism. The simplest form of prefetching is a read hint issued at a certain horizon from the read offset. A single read request typically issues a single prefetch request at an offset calculated from the read offset and prefetch horizon. In general, restoring backup workloads with data sets that include small files is slow (e.g., an order of magnitude slower than a large file workload) due to the fact that the small file workload does not get the prefetch advantages. One current way to avoid this problem is to bundle (containerize) small files so that they do not land on the filesystem. However, such approaches are typically not sufficient to maintain small file restoration performance. Another possible approach is if the client requesting the small file restores lets the filesystem know that the read is coming through a hint that can trigger an internal prefetch. However, public protocols do not currently support any such application programming interfaces (APIs).

In present systems, an application opens a file and then queues up the handle with the request, along with the file offset and length. Such semantics are rather limited and do not provide full information of destination for purposes of efficient file restores, especially for small files. This approach generally avoids the overhead of opening the file and passing individual requests, and enables the underlying library to adjust the read size, and read-ahead queuing method to ensure optimal performance.

What is needed, therefore, is a system that indicates an intent to read a file, such as a small file, and passes the file handle (or path) of the file, and the destination handle (or path) where the data must be read into.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

Figure 1:
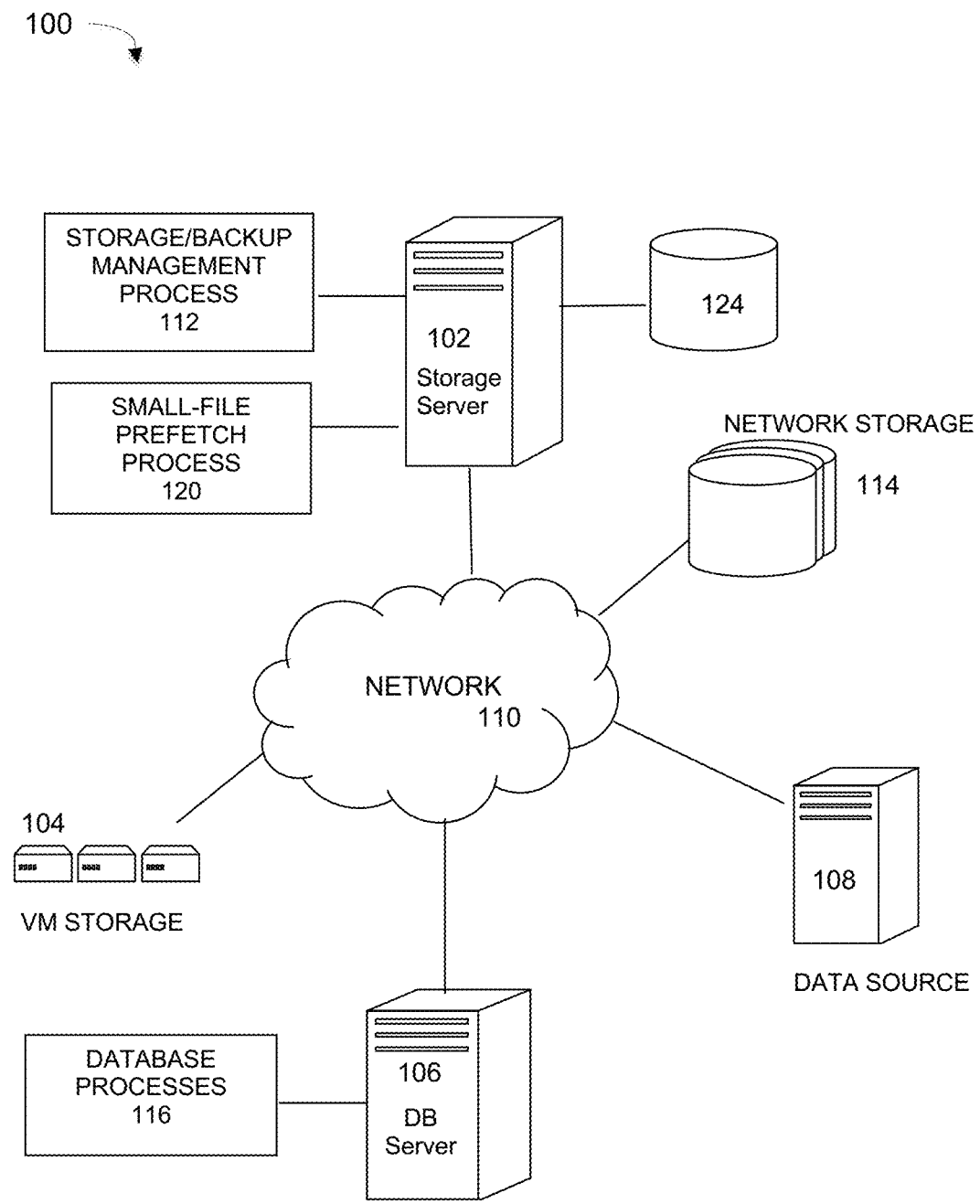
FIG. 1 is a diagram of a computing network implementing small file restoration process in a deduplication storage system, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a process for improving small file restores in deduplication backup systems. FIG. 1 illustrates a computer network system that implements one or more embodiments of a data processing and storage network system implementing an improved small file restoration process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

Figure 2:
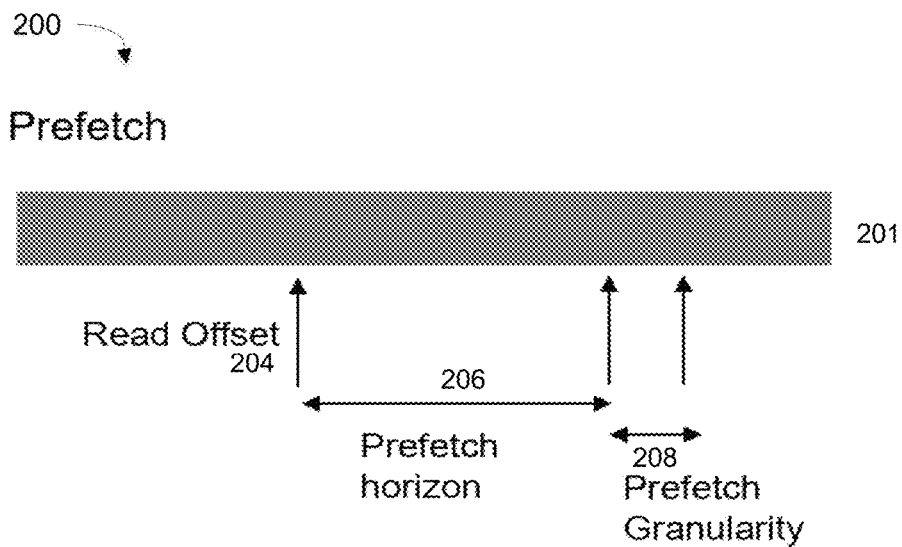
FIG. 2 illustrates a prefetch process that is adopted for use with a queue-based mechanism to improve small file restores, under some embodiments.

As mentioned in the background section above, in a typical filesystem, data restores are aided by a read-ahead (prefetch) mechanism, such as a read hint issued at a certain horizon from the read offset. A single read request typically issues a single prefetch request at an offset calculated from the read offset and a set prefetch horizon. FIG. 2 illustrates a prefetch process that is adopted for use with a queue-based mechanism to improve small file restores, under some embodiments. FIG. 2 shows certain pre-fetch parameters defined for a horizontal axis 201 denoting memory capacity in megabytes (MB), or any similar unit of storage). As shown in FIG. 2, for a prefetch request issues at a point after an application's read request as defined by a read offset 204 and a prefetch horizon 206. As shown in the example scenario of diagram 200, a read comes in at a read offset 0 MB, and a prefetch request is issued at the 0 MB plus the prefetch horizon value in MB. Typically, the prefetch horizon 206 is on the order of 30 MB or so (e.g., between 15 to 50 MB), and is higher when the underlying storage layer is slower, although any value is possible.

The prefetch granularity 208 shown in the example of FIG. 2 is on the order of 1 MB for a prefetch horizon of 30 MB. The prefetch granularity is the size of the prefetch I/O operation. In large sequential reads, it is typically 1 MB for one example, though other sizes are also possible.

The mechanism 200 generally works well since the application read requests mostly find all their data already present in the read-ahead cache, and therefore they need not block for I/O. This improves read performance considerably, and works well with large sequential reads. For small files (or random I/O operations), however, the prefetch 200 is not always useful. Effective prefetches thus require a minimum file size. Furthermore, deduplication file systems have a lower number of spindles at the backend. This implies considerably lower performance for small file workloads. Without the benefit of prefetches, each read request becomes a blocking read, and is limited by the backend storage performance.

For purposes of description, a small file is technically any file small smaller than the size of the prefetch horizon 206. Practically, small files are files on the order of 1 MB or less, and are typically of a size on the order of 100 KB for metadata files, and so on. In current systems, after an application issues a read for a small file (e.g., 1 MB), an I/O request is sent to the file system, whereupon the file system issues the read. The file system will then determine that prefetching is useless as the prefetch horizon 206 is larger than the file size. The I/O is serviced as the read I/O completes, and the throughput of the read is dependent on the disk read latency for that I/O operation.

Embodiments of a small-file prefetch process 120 improve prefetch performance for small files by extending a Data Domain application programming interface (API) to send hints about incoming read requests to provide the prefetch advantage for small file restores.

In an embodiment, such an API extension is implemented on DDBoost APIs as provided by DellEMC, or any API for similar protocols. The Data Domain filesystem works with a propriety library, called Data Domain Bandwidth Optimized Open Storage Technology (OST), or "DDBoost." This library links with the application to reduce the bandwidth required by ingests. This method translates the application read and write requests to DDBoost APIs.

DDBoost is a system that distributes parts of the deduplication process to the backup server or application clients, enabling client-side deduplication for faster, more efficient backup and recovery. A data storage deployment may use any combination of interfaces simultaneously to store and access data. The clients, which may be referred to as DDBoost clients, may use the DDBoost backup protocol to conduct backups of client data to the appliance pool, restore the backups from the appliance pool to the clients, or perform other data protection operations. The DDBoost library exposes APIs to integrate with a Data Domain system using an optimized transport mechanism. These API interfaces are exported by the DDBoost Library to provide mechanisms to access or manipulate the functionality of a Data Domain file system. Embodiments may utilize the DDBoost File System Plug-In (BoostFS), which resides on the application system and presents a standard file system mount point to the application. With direct access to a BoostFS mount point, the application can leverage the storage and network efficiencies of the DDBoost protocol for backup and recovery. Some specific embodiments are described in conjunction with storage systems, products, and services referred to as Data Domain as provided by Dell EMC. It should be appreciated, however, that the described systems and techniques can be applied to other similar storage systems, products, and services. For example, some specific embodiments are described in conjunction with the DDBoost protocol. Aspects and principles of embodiments described, however, are applicable to other protocols such as NFS, CIFS, and others.

Figure 3:
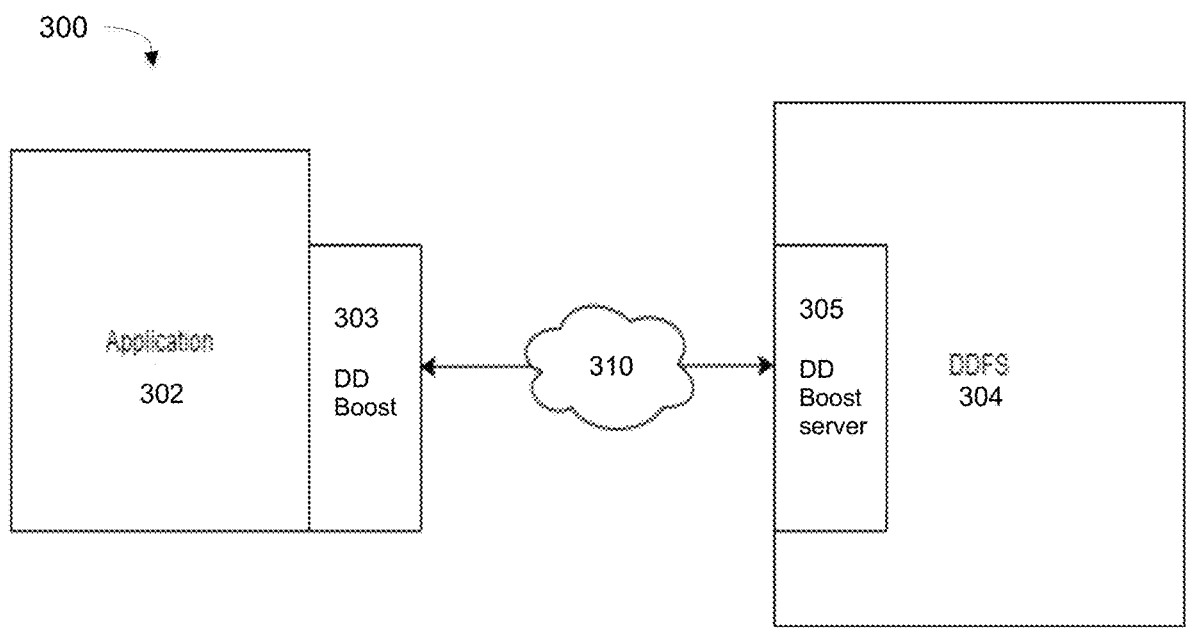
FIG. 3 illustrates the use of DDBoost APIs in conjunction with a Data Domain file system, under some embodiments.

FIG. 3 illustrates the use of DDBoost APIs in conjunction with a DDFS system 300, under some embodiments. As shown in FIG. 3, for a backup application, client-side DDBoost library 303 interacts through the DDBoost API to the DDFS system 304 through a DDBoost server process 305. For an ingest, or restore process, the application 302 issues an open file, which is followed by a series of read or write requests, which are then followed by a file close.

Following is a generic example of a DD Boost API, to open a file and specify the operation, in this case for reading.
  boost_open_file (file_path, FLAG=FOR_READING, &file_handle);
This would be followed by read requests:
  boost_read(file_handle, offset, length, &buffer);

The DDBoost library offers additional options for opening/reading, but the above simply provides a generic interface with parameters needed to support the small file restoration extension.

As stated above, current read request processing leads to the file system determining that prefetching is useless if the prefetch horizon is larger than the file size, so that for small files the throughput of the read is dependent on the disk read latency. Embodiments of the prefetch process 120 extend the DDBoost API to introduce a queue-based mechanism to the DDBoost protocol. Under this embodiment, the read requests for small files will be inserted into a queue that is serviced by the file system. Being in the queue means that these small files can be effectively prefetched into the file system read ahead cache, as the queue stores a collection of files that together are at least as large as the prefetch horizon.

When the DDBoost library is linked to the application 302, the open request is changed to be a DDBoost API call which is received by the DDBoost server 305 server running within the DDFS 304. The DDBoost server 305 interprets the request to open the file and internally calls the filesystem open API. If the application chooses to write data to this file descriptor, the DDBoost API can do more intelligent processing, like anchoring, fingerprinting and using its APIs, requesting the server to filter the ingested data, and so on. If the application chooses to restore the file, the read request is sent to the DDBoost server 305, which requests the file system for the data. For large files, the DDBoost read APIs perform prefetching as normal. Closing the application tears down the DDBoost connection and the stateful context it has established with the server 305.

Issuing the read requests as illustrated above, triggers the process to use the queue/prefetch. In an embodiment, the following API extension can be used. To specify the queue position, an additional parameter for the 'queue_priority' is added to the API above, and introduced on the open command:
  boost_open_file (file_path, FLAG=FOR_READING, QUEUE_PRIORITY=HIGH, &file_handle);

Since the process involves a queue, this operation is essentially an asynchronous job. With the queue, there is a possibility of re-ordering according to the priority associated with that job. So the DDBoost library can act as a conduit where the higher priority reads are given preference over the lower priority jobs. This is the queue position.

Figure 4:
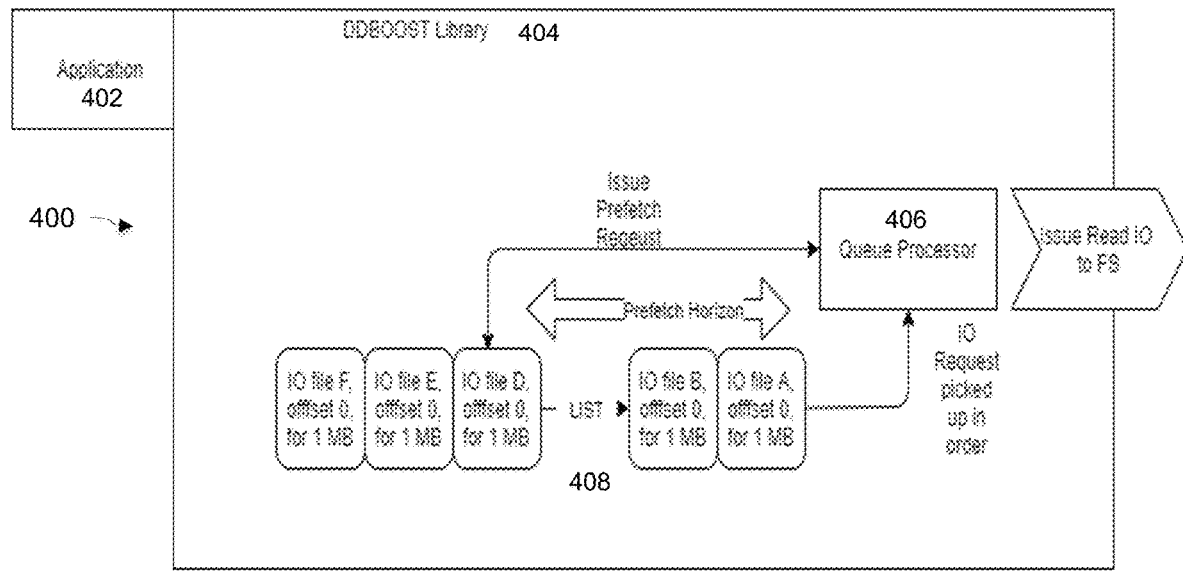
FIG. 4 illustrates a queue processor for use in a small file restore process, under some embodiments.

Embodiments thus extend the restore functionality for the small files by introducing an API-based queue mechanism in which the application queues up the read request, and a queue processor intelligently processes the requests. FIG. 4 illustrates a queue processor for use in a small file restore process, under some embodiments. FIG. 4 shows a system 400 in which an application 402 includes a DDBoost library 404 that includes a queue processor 406 that issues read I/Os to the file system. For small files, the application 402 organizes its requests to read the small files into a queue 408. The sequence of files thus essentially constitutes a sequence of read I/O requests. As shown, a list of requests for n files denoted files A to F, are placed into queue 408. Each example file that needs to be read is of size 1 MB, and the application 402 has issued a read for each such file at offset 0.

The offset 0 requests implies that it is from the start of the file. For small files, which will be completed in one I/O operation, this would be normal. Other offsets can also be used, but there is generally no effect of a non-zero offset.

Figure 5:
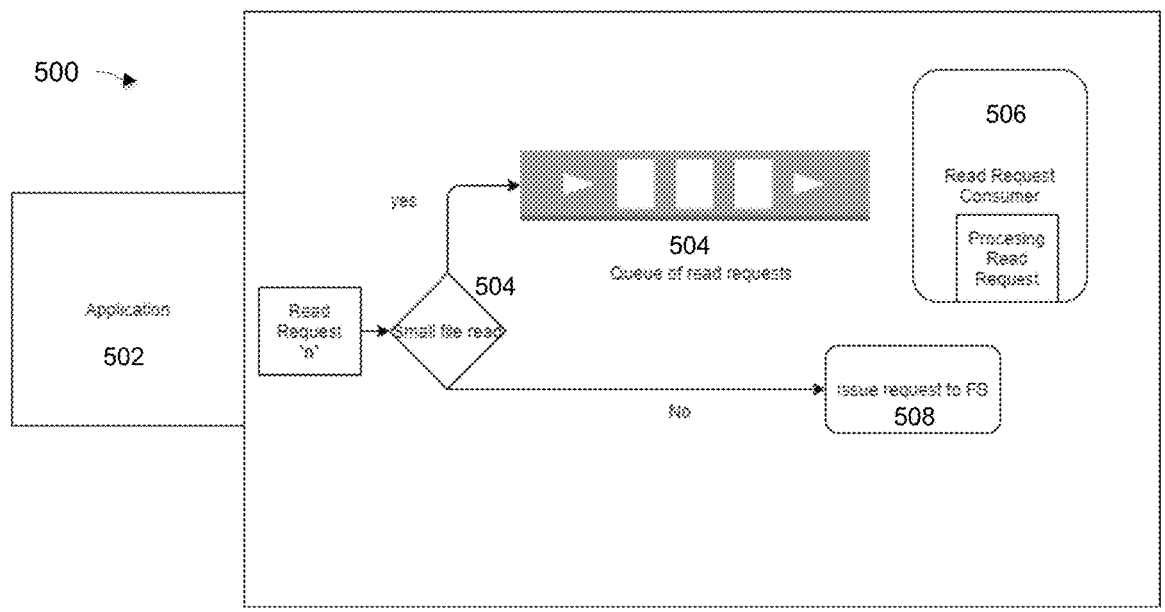
FIG. 5 illustrates a system that filters files depending on file size to process small files through the queue processor of FIG. 4, under some embodiments.

For the embodiment of FIG. 4, the read operations operate on small files only, and a parser or filter process may direct only small files, which are files under a defined threshold (e.g., less than or equal to 1 MB) to the DDBoost library 404 for processing, while all other files are processed for I/O reads normally. FIG. 5 illustrates a system that filters files depending on file size to process small files through the queue processor of FIG. 4, under some embodiments. As shown in FIG. 5, the application 502 produces a read request for n files. The read request is processed by a filter or decision process 504 that determines if each file of the read request is a small or large (non-small) file. The threshold may be set to any appropriate value as required by system configuration and constraints. For the examples described herein, the small file threshold is 1 MB or less. Small files are gathered to form the queue of read requests 504 for processing by the queue processor where they are then provided to the read request consumer 506 which processes the read request. The large files are passed directly to the file system 508.

Figure 6:
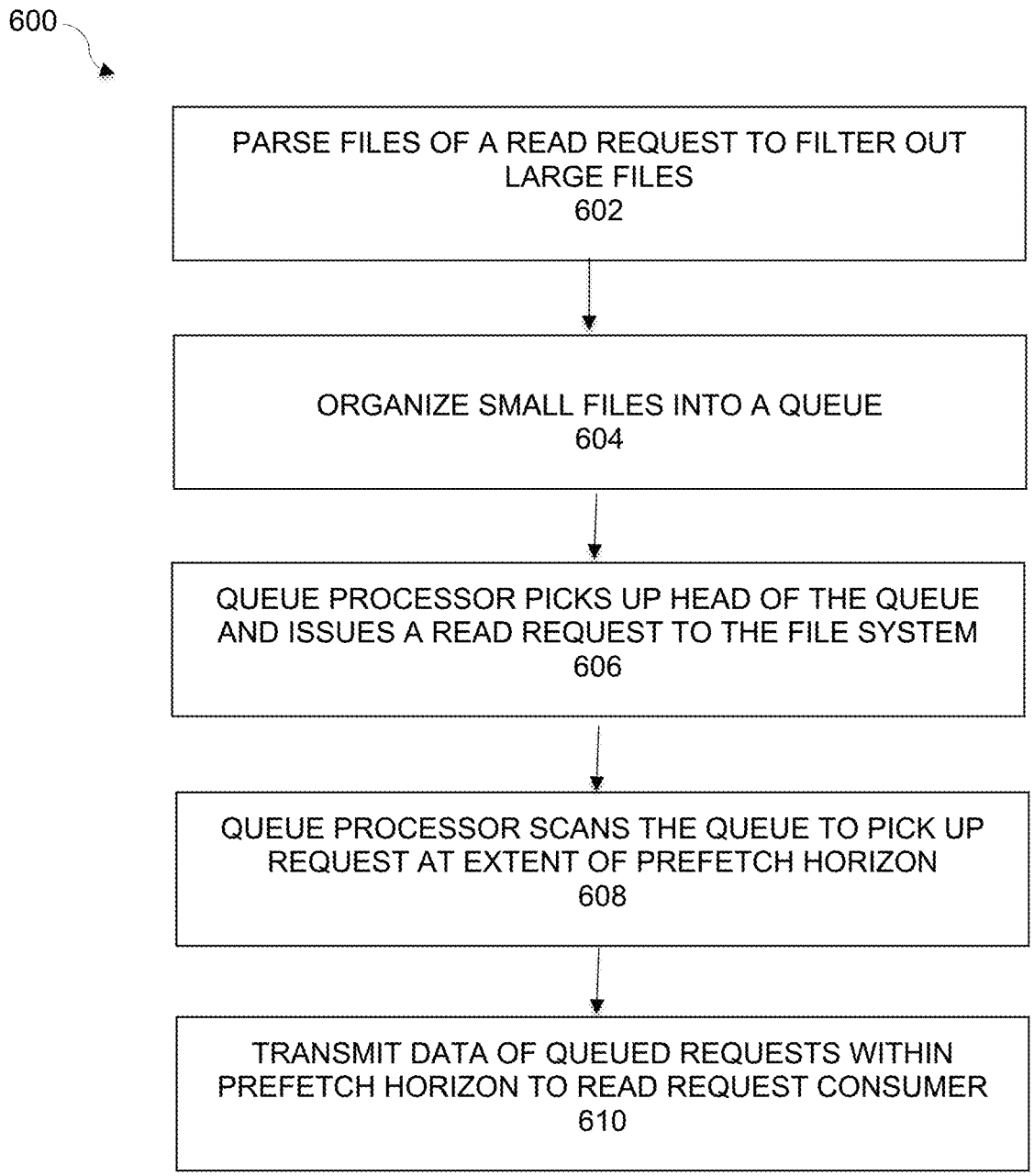
FIG. 6 is a flowchart that illustrates processing small file read requests using a queue process, under some embodiments.

FIG. 6 is a flowchart that illustrates processing small file read requests using a queue process, under some embodiments. Process 600 of FIG. 6 begins by parsing the files of a read request to filter out large files so that only small files are processed by the queue processor, 602. The small files are then organized into a queue, 604. As the queue builds up, the queue processor 406 picks up the head of the queue 408 and issues the read request to the filesystem, 606. As illustrated in FIG. 4, this starts with I/O for file A, at offset 0, for 1 MB.

The queue processor 406 also scans the queue 408 and picks up the request that is at the extent of the prefetch horizon, and selects that request to be prefetched, 608. In diagram 400, this would be file D, at offset 0 for 1 MB. For this example, by the time the read request for file D hits the head of the queue 408, the prefetch request would have brought the data into memory, thus resulting in a performance increase for the read operation for this (small) file. Thus, as shown in FIG. 6, the queued requests within the prefetch horizon are then transmitted in sequence to the read request consumer, 610 (e.g., 506 in FIG. 5). In a steady state, the queue 408 is maintained by having a set of outstanding I/Os, thus the prefetching of the requests results in higher performance overall for the small files. In this steady state, the applications are issuing out batches of read requests. The prefetches for those are issued out when the reads are at an appropriate distance from the queue processor, and this would be the set of outstanding I/Os.

For the embodiment of FIG. 4, the read I/O's are issued in the order of the files as organized in the queue 408, in a first-in, first-out manner. Alternatively, and as described further below, certain re-ordering mechanisms may be used to optimize issuing of the read I/Os.

Figure 7:
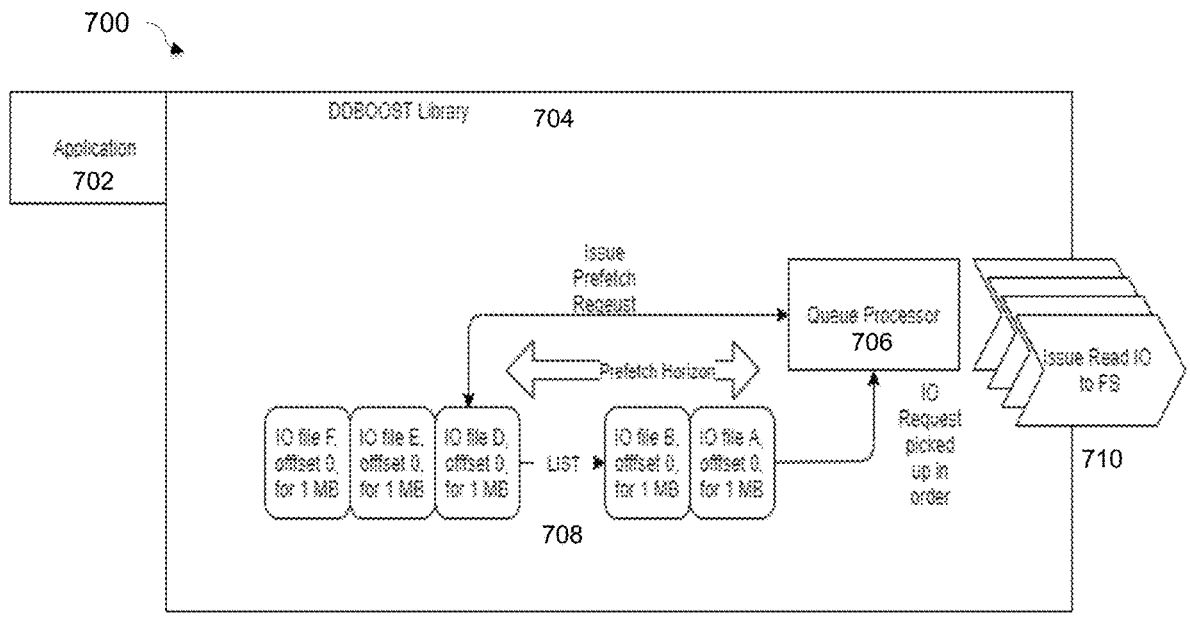
FIG. 7 is a flowchart that illustrates a system for processing multiple threads for small file read requests, under some embodiments.

The queue processor 406 is an efficient abstraction layer between the application read requests and the file system. This allows for a disassociation of the application requests and the data storage system. Essentially, the queue and queue processor mechanism eliminate the one-to-one relationship model that exists for read streams. In an embodiment, the queue processor system can be configured to work with multiple threads which could process reads and prefetches. FIG. 7 is a flowchart that illustrates a system for processing multiple threads for small file read requests, under some embodiments. As shown in system 700, application 702 generates a number of read requests that generate I/Os for an number (n) of files that are placed into queue 708 in the DDBoost library 704. The queue processor processes the queue if I/Os to issue multiple read I/O requests 710 to the file system.

This embodiment can be leveraged to process the requests out of order, thus providing an opportunity to create a system that can enable quality of service (QoS) for the read requests. Requests can be prioritized by the user or the system based on one or more characteristics. The application requests that demand or require a higher QoS, would be preferred over other requests so that the read I/O's 710 for those requests would be issued first or before the other requests. This allows the DDBoost library 704 to re-order the requests in order of priority or create opportunities to reduce the amount of data read from the file system, such as if there is similarity between certain files. It thus also allows for optimization of read request issuance for efficient I/O processing. Thus, as the I/O files within the prefetch horizon are sent by the queue processor 706, the read I/O can be issued in order of the file requests, e.g., File A, File B, File C, and so on, or they may be sent in any order as determined by the re-order process.

With respect to the functionality of the queue processor (e.g., 406 or 706), for each thread which issues out an I/O request, there is a maximum number of outstanding I/Os, that each thread could include. This is analogous to most public protocols, which have a notion of a sliding window of I/O request slots. The I/O request is sent to the server, when the slot opens up and when the I/O request is returned done, the slot is marked open. This allows for a throttling mechanism wherein the server is not overwhelmed by client requests.

Such a mechanism is also available in the DDBoost protocol. DDBoost is a stateful protocol, which means that when it opens a file for read or write, a state is opened and held in memory corresponding to the file. This is called a stream in DDFS. The construct of the stream, however, is more than just a state on the server. Streams enable a multi-component pipe within DDFS that can be used to track memory and resources for a given file. Among other things, the stream enables using Non-Uniform Memory Access (NUMA) and zero-copy memory transfers. There are a limited number of streams in a DDFS appliance, and thus streams represent a valuable resource.

The Data Domain file system has a notion of a stateful stream for each file that has been opened. The stream construct is used for NUMA aware memory access, amongst other things. A 'thread' corresponds to one of the workers on the client side (on the queue processor). As the simplest implementation, the system can have a one-to-one relationship between the thread and the I/O request for a file. As the read request for the file is brought to the file system, the application first opens a stream for the file in question. If it is not already open, it assigns the file to the queue processor. When the I/O request reaches the head of the queue, the queue processor then routes the request to the correct stream/thread. Any prefetches would then use the same stream.

Figure 8:
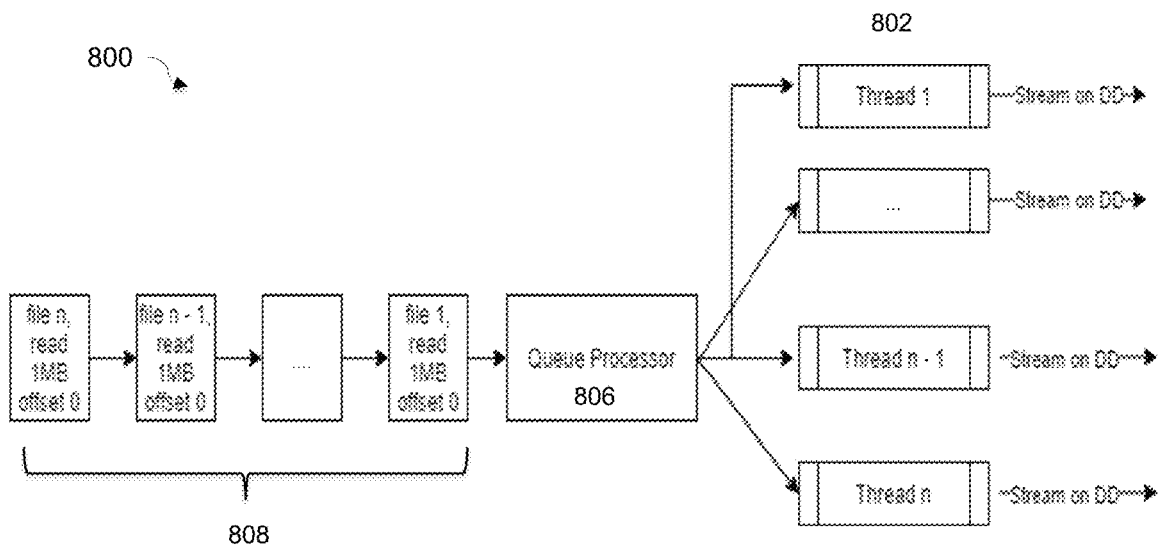
FIG. 8 illustrates a system of performing small file restores using separate threads, under an embodiment.

FIG. 8 illustrates a system of performing small file restores using separate threads, under an embodiment. As shown in FIG. 8, system 800 includes a number of files 808 denoted file 1 to file n processed in turn by a queue processor 806. The application opens a thread/stream 802 for each file so that there are n threads for n files. The approach shown in FIG. 8 can be wasteful, however, because the number of streams 802 that are open must be the same number of I/Os on the n unique files. As mentioned above, a stream in a Data Domain (or similar) system is a precious commodity. Furthermore, there is no advantage of opening the stream before the prefetching operation, even in this simple example. Furthermore, it should be noted that in case of small files, the read request will probably not find the stream for the file, and therefore will need to open the stream, create the thread, and then queue itself up.

Figure 9:
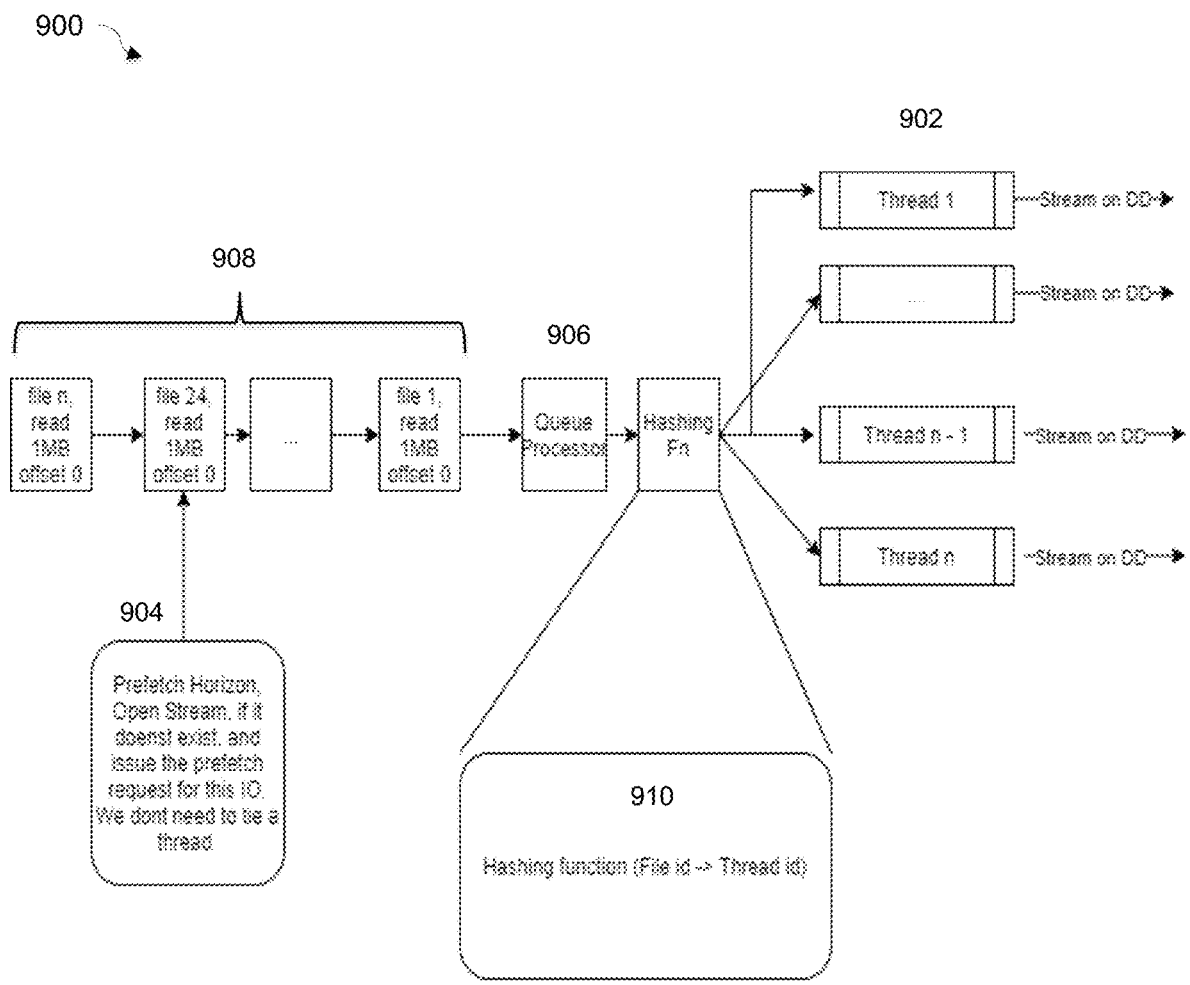
FIG. 9 illustrates a system of performing small file restores using separate threads, under an alternate embodiment that routes files to open threads using a hashing function.

To overcome this issue, an alternative embodiment introduces a routing technique using hashing function to direct certain streams to specific open threads. FIG. 9 illustrates a system 900 for performing small file restores using separate threads, under this alternative embodiment. As shown in FIG. 9, system 900 includes a number of files 908 denoted file 1 to file n processed in turn by a queue processor 906. As an extension of system 800, system 900 also includes a hashing function 910 after the queue processor which acts to route specific files to respective specific threads 902. Using this system, the application first opens a stream for file in question, if it is not already open when the file is picked for prefetching. The file is then routed to a thread having an appropriate thread number as determined by the hashing operation 910. In an embodiment, a certain stream is routed to an appropriate thread based on the file ID of the file. Thus, the hashing function can be expressed as:

Hashing Function (File_ID→Thread_ID)

As shown in FIG. 9, the prefetch horizon 910 is set at File 24. The number of worker threads is limited (i.e., much lower than the streams on the DD system). There is a defined a method of hashing the file to the thread, so that all I/Os for a given file go to the same thread, which is interfacing to the stream associated with the file. For FIG. 9, at the prefetch horizon, if the stream does not exist for that file, the process could open the same and issue out the prefetch request. This mechanism ensures that all I/Os to the same file go to the same thread. It should be noted that in the above optimization, the process disassociates the number of threads from the number of streams, thus providing an optimization over the embodiment of FIG. 8.

Adaptive Prefetch

In the methods described above, the application would open the file and then queue up the handle with the request, along with the offset and length. In an embodiment, the queuing semantics are extended to create the intent to read a file (such as a small file) rather than simply opening the file. In this intent statement, the application passes the file handle (or path) of the file, and the destination handle (or path) where the data must be read into.

As the queue is being processed, the prefetch for the request (i.e., just the handle for the file, offset, and length) is passed to the file server. As part of processing the prefetch request, the filesystem processes the request to equivalently 'open' the file and bring the data into memory, and then it closes the file.

As the read request for the same file reaches the filesystem (e.g., DDFS), the file data is read from memory. Once the buffers reach the client, the data is written by the library to the destination handle. In this method, the file is not being opened on the client for the prefetch request. Instead, the embodiment implements "just in time" or adaptive prefetching, thus making it highly memory efficient, especially in the case of reading small files.

Figure 10:
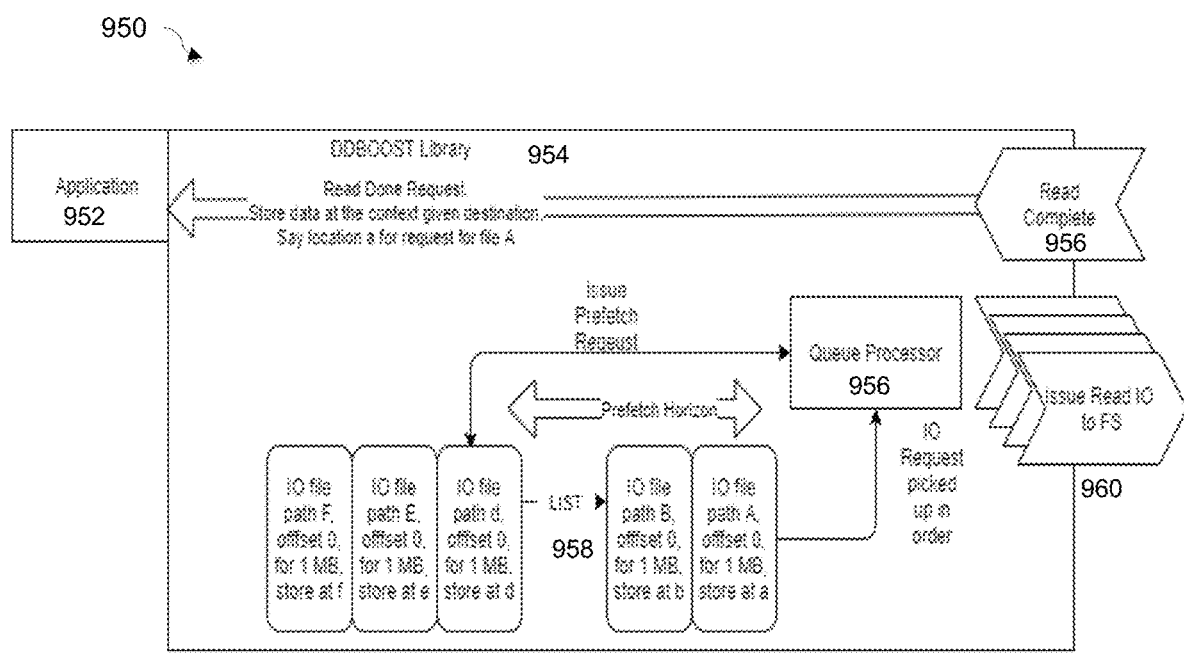
FIG. 10 is a diagram that illustrates an adaptive prefetch system for processing multiple threads for file read requests, under some embodiments.

FIG. 10 is a diagram that illustrates an adaptive prefetch system for processing multiple threads for file read requests, under some embodiments. As shown in system 950, application 952 generates a number of read requests that generate I/Os for an number (n) of files that are placed into queue 958 in the DDBoost library 954. The queue processor processes the queue if I/Os to issue multiple read I/O requests 960 to the file system. A read complete flag 962 is set upon the completion of a read request. The read data is then written directly to the file location provided by the application 952.

Figure 11:
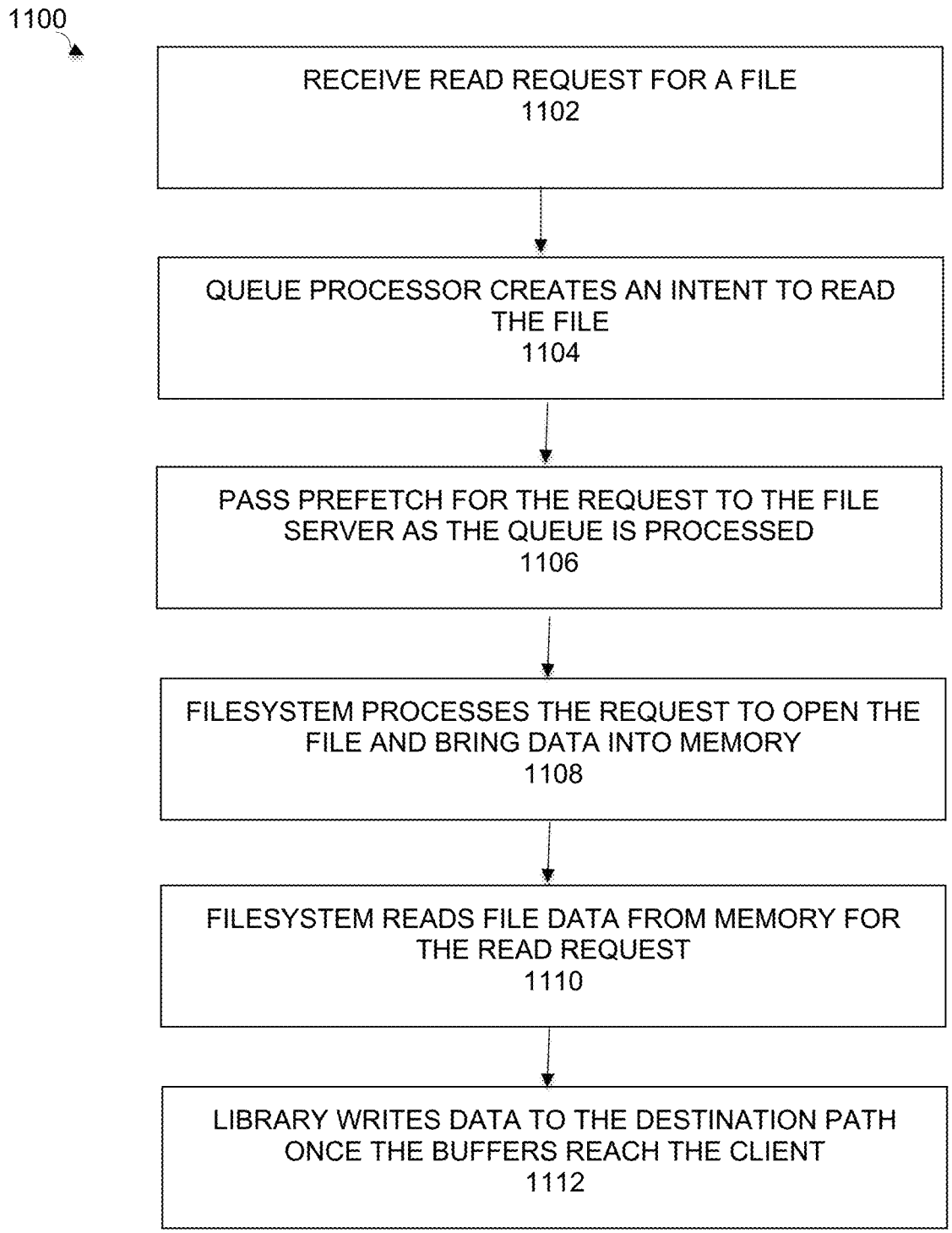
FIG. 11 is a flowchart illustrating an adaptive prefetch method for processing multiple threads for file read requests, under some embodiments.

FIG. 11 is a flowchart illustrating an adaptive prefetch method for processing multiple threads for file read requests, under some embodiments. As shown in FIG. 11, process 1100 begins with the system receiving a request to read a file (read request), 1102. The queue processor 956 then creates an intent to read the file, rather than opening the file at this point, 1104. During this step, the application passes the file handle (or path) of the file, and the destination handle (or path) where the data must be read into, 1106. As the queue is being processed, the prefetch for request (i.e., file handle, offset, and length) is passed to the file server, 1106. As part of processing the prefetch request, the filesystem processes the request to equivalently 'open' the file, and bring the data into memory before it closes the file, 1108. As the read request for the same file reaches the filesystem (e.g., DDFS), the file data is read from memory, 1110. The data is then written by the library to the destination handle, once the buffers reach the client, 1112. That is, once the data is retrieved, the client library writes it directly to the client filesystem at the location specified.

The use of the queueing semantics to generate an 'intent' to open a file, and the use and passing of file and destination handles helps to dynamically allocate memory for the file read request. This adaptive prefetching thus represents a 'just-in-time' mechanism that makes file restore operations in a deduplication file system highly memory efficient.

Embodiments described herein provide several benefits for different data restore scenarios. For example, for native filesystem backups, the method improves the performance of any filesystem stored in native format, rather than a single container (e.g., Hadoop file systems). It improves the performance of database application stored as small files (e.g., MongoDB, and Cassandra). For traditional backups, it improves the performance of backup processing, when the backup processing is dependent on reading data from small state files on the appliance.

Embodiments of the processes and techniques described above can be implemented on any appropriate backup system operating environment or file system, or network server system. Such embodiments may include other or alternative data structures or definitions as needed or appropriate.

Figure 12:
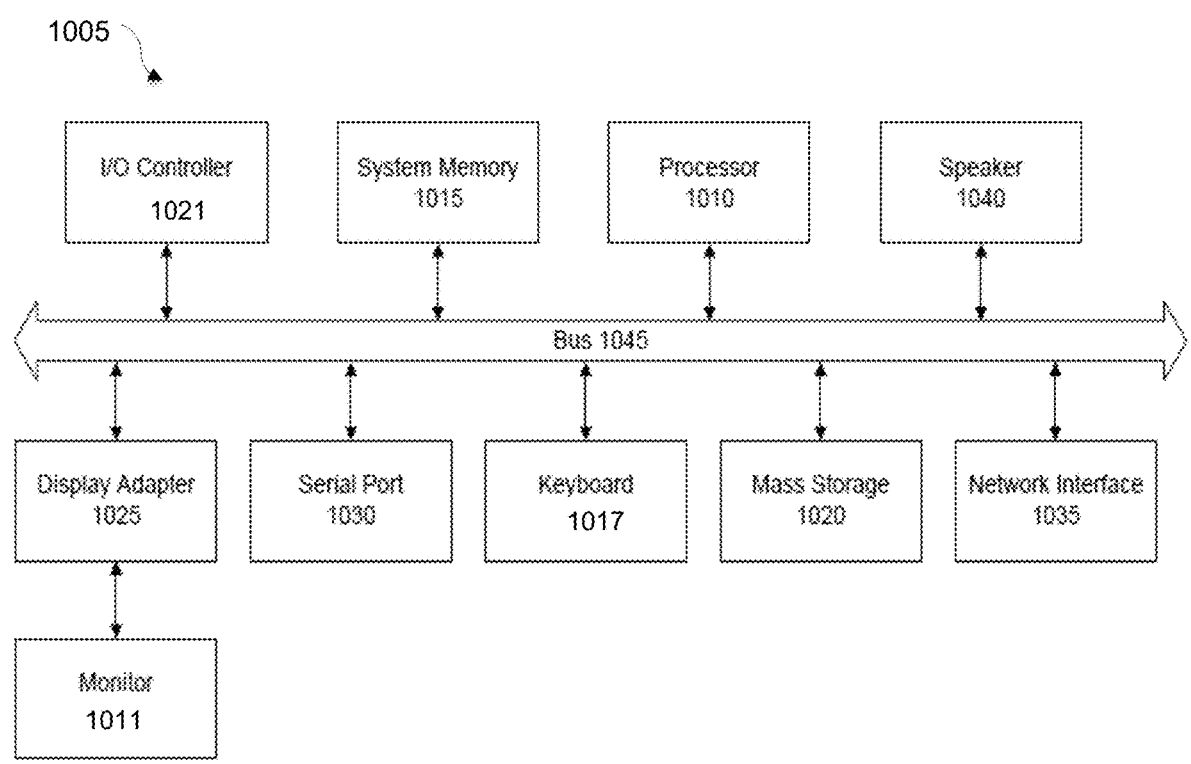
FIG. 12 is a system block diagram of a computer system used to execute one or more software components of the described processing operations, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 12 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
identifying a plurality of files to be restored in a deduplication backup system;
inserting read requests for a plurality of small files in a prefetch queue;
creating an intent to read a file of the plurality of small files using a file handle comprising a pathname for the file and a destination handle specifying where file data is to be read into;
passing the file handle, an offset, and a length and the destination handle to a file server;
processing a prefetch request in the file server to bring the file data into memory before closing the file; and
processing a read request in a file system to read the file data from memory.

2. The method of claim 1 wherein the files comprise one of small files or large files, and wherein a small file comprises a file having a size less than a defined threshold size that is less than a prefetch horizon size, and a large file comprises a file having a size exceeding the defined threshold size.

3. The method of claim 2 wherein restoration requires issuing a read request within an input/output (I/O) request to the file system, the method further comprising:

placing the small files in the prefetch queue such that a combined size of the small files meets or exceeds a size of the prefetch queue as defined by a prefetch horizon;

issuing, by a queue processor, a read request to the file system for a first file in the prefetch queue;

scanning, by the queue processor, the prefetch queue to find a read request for a file at the prefetch horizon; and prefetching the file at the prefetch horizon.

4. The method of claim 3 wherein the prefetching step moves data from a prefetched file into a read-ahead cache to be sent to a read request consumer of the file system.

5. The method of claim 4 wherein the prefetch queue comprises a hint to the read request consumer that a read I/O is imminent for purposes of filling the read-ahead cache and preventing a need to issue a blocking I/O operation.

6. The method of claim 5 wherein the read request processing step comprises part of a deduplication backup process executed by a data storage server running a Data Domain file system (DDFS) and including a Data Domain Bandwidth Optimized Open Storage Technology (DDBoost) library that links with an application to reduce bandwidth required for data ingests, and which translates application read and write request to DDBoost application program interfaces (APIs).

7. The method of claim 6 further comprising issuing, by the application, a file open request followed by a plurality of read and write requests and a file close.

8. The method of claim 7 further comprising the file open request is changed into a DDBoost API call received by a DDBoost server running in the DDFS, and wherein the application writes data through the DDBoost API.

9. The method of claim 8 wherein a read request of the plurality of read requests is sent to the DDBoost server, which requests the file data from the deduplication file system.

10. The method of claim 9 wherein issuing a read request triggers the application to use the queue queue and the queue processor, and further wherein closing the application removes a connection to the DDBoost server and a stateful context it has established with the DDBoost server.

11. The method of claim 1 further comprising issuing a plurality of read I/O requests as individual threads, wherein each read I/O request corresponds to a single file in a prefetch horizon.

12. The method of claim 11 further comprising re-ordering the read I/O requests from a default first-in/first-out order to an order determined by one or more quality of service factors including relative importance of read request, number of open threads, and number of outstanding I/O requests.

13. A computer-implemented method comprising:
receiving a request to read a file by an application;
creating, by a queue processor an intent to read the file, rather than opening the file at this point using a file handle comprising a pathname for the file and a destination handle specifying where file data is to be read into;
first passing, as part of an intent statement, the file handle and the destination handle to a file server;
second passing a prefetch for the request comprising the file handle, offset, and length to the file server;
processing the prefetch to now effectively open the file and bring the file data into memory before closing the file;
reading the file data from memory as a read request for the file reaches the file server; and
writing the file data to a location specified by the destination handle.

14. The method of claim 13 wherein the file comprises one of a small file or a large file, and wherein the small file comprises a file having a size less than a defined threshold size that is less than a prefetch horizon size, and the large file comprises a file having a size exceeding the defined threshold size.

15. The method of claim 14 wherein the request comprises a data restore operation issuing a read request within an input/output (I/O) request to a file system of the file server, the method further comprising:
placing the small file in a prefetch queue such that its size when combined with other small files meets or exceeds a size of the prefetch queue as defined by a prefetch horizon;
issuing, by the queue processor, a read request to the file system for a first file in the prefetch queue;
scanning, by the queue processor, the prefetch queue to find a read request for a file at the prefetch horizon; and
prefetching the file at the prefetch horizon.

16. The method of claim 15 further comprising moving data from a prefetched file into a read-ahead cache to be sent to a read request consumer of the file system.

17. A system comprising:
a first processor component identifying a plurality of files to be restored in a deduplication backup system, wherein restoration requires issuing a read request within an input/output (I/O) request to a file system, and placing the files in a prefetch queue such that a combined size of small files meets or exceeds a size of the prefetch queue as defined by a prefetch horizon;
a queue processor creating an intent to read a file of the small files using a file handle comprising a pathname for the file and a destination handle specifying where file data is to be read into;
an application executed by a file server, and passing, as part of an intent statement, the file handle and the destination handle to the file server, and further passing a prefetch for the read request comprising the file handle, an offset, and a length to the file server; and
a second processor component processing the prefetch to effectively open the file and bring the file data into memory before closing the file, reading the file data from memory as a read request for the file reaches the file system, and writing the file data to a location specified by the destination handle.

18. The system of claim 17 wherein the queue processor further issues a read request to the file system for a first file in the prefetch queue, and scans the prefetch queue to find a read request for a file at the prefetch horizon, and prefetching the file at the prefetch horizon, and wherein the prefetch queue comprises a hint to a read request consumer that a read I/O is imminent for purposes of filling a read-ahead cache and preventing a need to issue a blocking I/O operation.

19. The system of claim 18 wherein a small file comprises a file having a size less than a defined threshold size that is less than a prefetch horizon size.

20. The system of claim 19 further comprising moving data from a prefetched file into a read-ahead cache to be sent to a read request consumer of the file system.

* * * * *